US007523309B1

(12) United States Patent
Talbot et al.

(10) Patent No.: US 7,523,309 B1
(45) Date of Patent: Apr. 21, 2009

(54) METHOD OF RESTRICTING ACCESS TO EMAILS BY REQUIRING MULTIPLE LEVELS OF USER AUTHENTICATION

(75) Inventors: Mark William Talbot, Austin, TX (US); Lisa Anne Seacat, San Francisco, CA (US); Kulvir Singh Bhogal, Austin, TX (US); Robert Ross Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/163,061

(22) Filed: Jun. 27, 2008

(51) Int. Cl.
*H04L 9/00* (2006.01)

(52) U.S. Cl. .................. 713/166; 713/164; 713/165; 713/167; 726/28

(58) Field of Classification Search ............... 713/164, 713/165, 166, 167; 726/28
See application file for complete search history.

(56) References Cited

U.S. PATENT DOCUMENTS

| 6,192,396 | B1 * | 2/2001 | Kohler ................. 709/206 |
| 6,636,965 | B1 | 10/2003 | Beyda et al. |
| 6,643,684 | B1 | 11/2003 | Malkin et al. |
| 6,804,336 | B2 * | 10/2004 | Chiu ................ 379/100.08 |
| 6,920,564 | B2 | 7/2005 | Decuir |
| 7,017,181 | B2 * | 3/2006 | Spies et al. ................. 726/3 |
| 7,039,951 | B1 * | 5/2006 | Chaudhari et al. ........... 726/7 |
| 7,174,368 | B2 | 2/2007 | Ross, Jr. |
| 7,287,271 | B1 * | 10/2007 | Riggins ...................... 726/3 |
| 7,333,956 | B2 * | 2/2008 | Malcolm ................. 705/50 |
| 7,334,267 | B2 * | 2/2008 | Engstrom ................. 726/27 |
| 7,346,769 | B2 | 3/2008 | Forlenza et al. |
| 7,401,356 | B2 * | 7/2008 | Bandini et al. ............ 726/14 |
| 7,421,472 | B1 * | 9/2008 | Ross, Jr. ................. 709/206 |
| 7,424,543 | B2 * | 9/2008 | Rice, III ................. 709/229 |
| 7,447,903 | B2 * | 11/2008 | Sandhu et al. ............ 713/155 |
| 2002/0059144 | A1 | 5/2002 | Meffert et al. |
| 2002/0087479 | A1 * | 7/2002 | Malcolm ................. 705/64 |
| 2002/0112015 | A1 | 8/2002 | Haynes |
| 2002/0120869 | A1 | 8/2002 | Engstrom |
| 2002/0124052 | A1 * | 9/2002 | Brown et al. ............ 709/206 |
| 2002/0169954 | A1 * | 11/2002 | Bandini et al. ............ 713/153 |
| 2004/0078334 | A1 * | 4/2004 | Malcolm et al. ............ 705/50 |

(Continued)

FOREIGN PATENT DOCUMENTS

JP      6276221      9/1994

(Continued)

*Primary Examiner*—David Garcia Cervetti
(74) *Attorney, Agent, or Firm*—Wenderoth, Lind & Ponack, L.L.P.

(57) ABSTRACT

Requiring a user of a recipient's email account or application to enter a high security level authentication (e.g., password) in order to be able to view the contents or the existence of a high security level email. A sender of an email has the ability to identify, at the time of sending, a sent email as having a normal level of security or a high level of security. If the user of the recipient's email account does not have the correct high security level authentication (e.g., password), then the user will only be able to view emails identified as normal security level emails. In addition, a properly authenticated user of the recipient's email account will be able to designate any email as being a high security level email or a normal security level email.

1 Claim, 1 Drawing Sheet

U.S. PATENT DOCUMENTS

| | | | |
|---|---|---|---|
| 2004/0136513 A1* | 7/2004 | Chiu | 379/100.08 |
| 2004/0243856 A1* | 12/2004 | Shatford | 713/202 |
| 2005/0010801 A1* | 1/2005 | Spies et al. | 713/200 |
| 2005/0039004 A1* | 2/2005 | Adams et al. | 713/166 |
| 2005/0203855 A1* | 9/2005 | Malcolm | 705/64 |
| 2005/0204172 A1* | 9/2005 | Malcolm | 713/201 |
| 2005/0216771 A1* | 9/2005 | Malcolm | 713/201 |
| 2005/0267939 A1* | 12/2005 | Davidson et al. | 709/206 |
| 2006/0037055 A1* | 2/2006 | Hashimoto et al. | 725/86 |
| 2006/0248333 A1* | 11/2006 | Sandhu et al. | 713/155 |
| 2007/0067402 A1* | 3/2007 | Sugii et al. | 709/206 |
| 2007/0116281 A1* | 5/2007 | Brown et al. | 380/239 |
| 2007/0124400 A1* | 5/2007 | Lee | 709/206 |
| 2007/0169176 A1 | 7/2007 | Cook et al. | |
| 2007/0174455 A1* | 7/2007 | Sugimoto | 709/225 |
| 2007/0204145 A1* | 8/2007 | Bunn et al. | 713/152 |
| 2007/0204331 A1* | 8/2007 | O'Brien | 726/4 |
| 2007/0233794 A1 | 10/2007 | Singh | |
| 2007/0255790 A1* | 11/2007 | Weksler et al. | 709/206 |
| 2007/0271348 A1* | 11/2007 | Yang | 709/206 |
| 2008/0162346 A1* | 7/2008 | Aaron et al. | 705/44 |
| 2008/0168135 A1* | 7/2008 | Redlich et al. | 709/204 |
| 2008/0172717 A1* | 7/2008 | Malcolm | 726/1 |
| 2008/0172730 A1* | 7/2008 | Sandhu et al. | 726/9 |
| 2008/0194296 A1* | 8/2008 | Roundtree | 455/558 |
| 2008/0270789 A1* | 10/2008 | Bandini et al. | 713/156 |
| 2008/0300904 A1* | 12/2008 | Malcolm | 705/1 |
| 2008/0301297 A1* | 12/2008 | Malcolm et al. | 709/225 |
| 2008/0301454 A1* | 12/2008 | Malcolm et al. | 713/176 |
| 2008/0301761 A1* | 12/2008 | Malcolm | 726/1 |
| 2008/0301762 A1* | 12/2008 | Malcolm | 726/1 |

FOREIGN PATENT DOCUMENTS

| | | |
|---|---|---|
| JP | 2006211029 | 8/2006 |

* cited by examiner

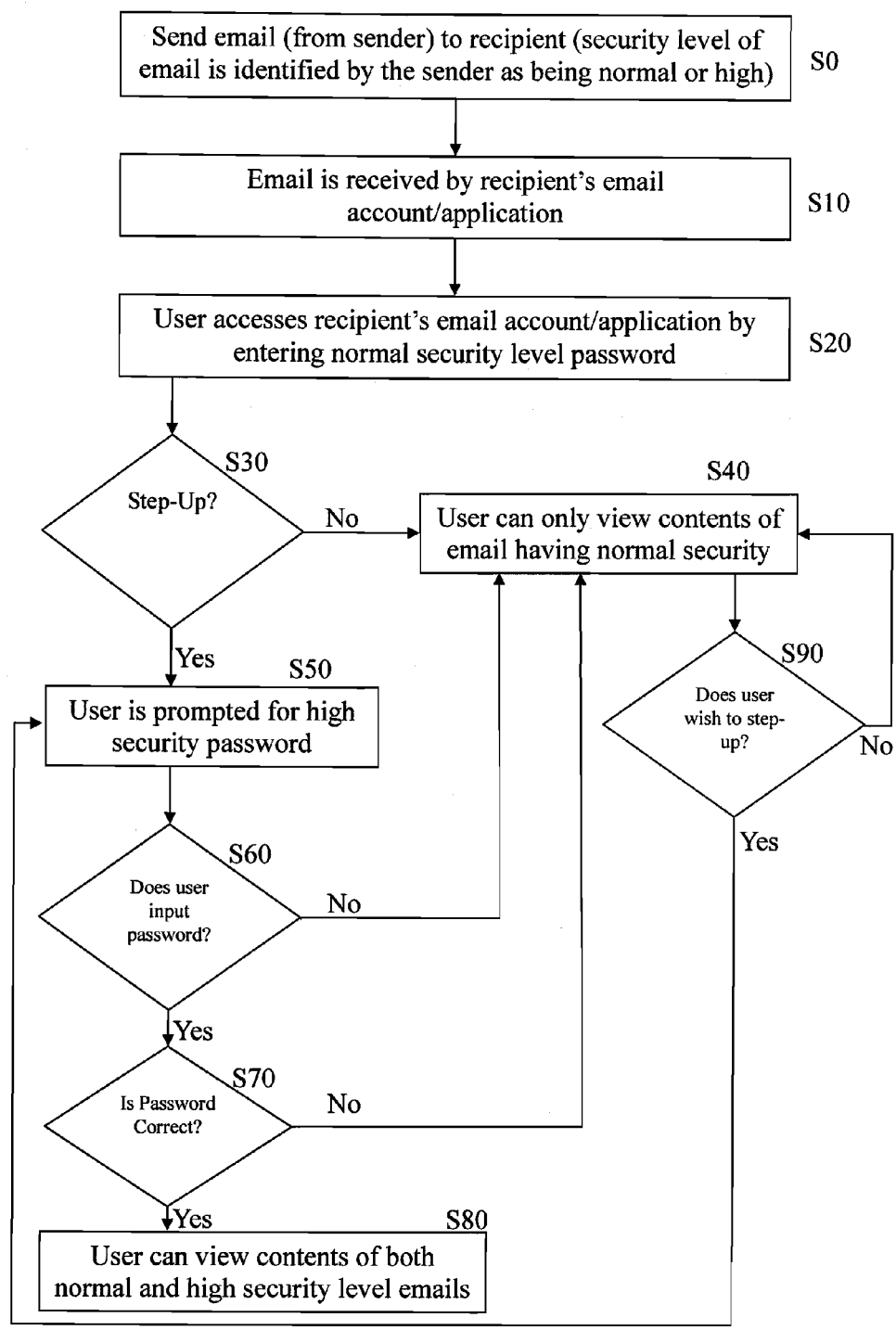

METHOD OF RESTRICTING ACCESS TO EMAILS BY REQUIRING MULTIPLE LEVELS OF USER AUTHENTICATION

BACKGROUND OF THE INVENTION

1. Field of the Invention

The present invention relates to restricting a user's access to emails by requiring multiple levels of user authentication while using a recipient's email account. More specifically, the present invention relates to granting/denying access to emails of a recipient's email account based on an authentication level obtained by a user of the recipient's email account.

2. Description of the Related Art

In a situation where a user delegates access to their computer account to another person, the user typically leaves their email application open, allowing the other person to access the user's emails. In addition, in a situation where a user grants another user access to their email application for the purpose of allowing the other user to send/receive emails from the user's email application, the other user will typically have access to every email in the user's email application.

However, in both scenarios, as described above, the user may wish to restrict the other user's access to particular emails that may contain sensitive or highly classified information (e.g., payroll information).

In order to address the above-mentioned problem wherein the other user has the ability to access sensitive or highly classified emails belonging to the user, a method of utilizing multiple levels of user authentication for accessing emails from an email account/application is described below.

SUMMARY OF THE INVENTION

In view of the above-mentioned problems, an embodiment of this invention provides a method of restricting access to emails of a recipient's email account by providing multiple levels of user authentication such that a user of the recipient's email account is only granted access to view emails for which the user has obtained proper authentication based on a designated security level.

An embodiment of this invention may include sending an email, from a sender to the recipient's email account, such that the security level of the email sent by the sender is designated by the sender. Subsequently, the sent email will be received by the recipient's email account.

Further, an embodiment of this invention may include accessing the recipient's email account at a normal authentication level by entering a normal security level authentication (e.g., password). This allows the user of the recipient's email account to only view emails that are designated as having a normal security level.

In addition, another embodiment of this invention may require stepping up the authentication level of the user of the recipient's email account by entering, when prompted, a high security level authentication (e.g., password). This allows the user of the recipient's email account to view emails designated as having a high security level and view the emails designated as having the normal security level.

Moreover, according to an embodiment of this invention, if the user of the recipient's email account is prompted to step-up the authentication level and the user decides not to enter any authentication (e.g., password), then the user will not be granted permission to view any email designated as a high security level email.

According to another embodiment of this invention, if the user of the recipient's email account is prompted to step-up the authentication level and the user enters an incorrect authentication (e.g., password), then the user will not be granted permission to view any email designated as a high security level email.

Furthermore, an embodiment of this invention provides that a properly authenticated user has the ability to designate any email as being a high security level email.

Also, according to an embodiment of this invention a properly authenticated user may have the ability to determine whether or not an existence of an email designated as a high security level email will be made known to the user of the recipient's email account.

Furthermore, additional embodiments of the present invention can be directed to an apparatus for restricting access to emails of a recipient's email account. Moreover, the present invention can be directed to a system including the above-mentioned apparatus for restricting access. In addition, the present invention can also be implemented as a program causing a computer to execute the above-described steps. The program can be distributed via a computer-readable storage medium such as a CD-ROM.

Additional features and advantages are described herein, and will be apparent from, the following Detailed Description and the figures.

BRIEF DESCRIPTION OF THE FIGURES

FIG. 1 is a flow chart illustrating steps included in an embodiment of the invention.

DETAILED DESCRIPTION OF THE INVENTION

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention.

As illustrated in FIG. 1, an embodiment of this invention may include a sender sending an email to a recipient, wherein the email is identified by the sender as being a normal security level email or a high security level email (S0). Next, the email sent by the sender is received by the recipient's email account and/or email application (S10). In addition, if the sender does not identify a security level, the user's email application or a receiver's email application may identify a security level (e.g., normal or high) by default.

In order for a user of the recipients email account/application to view the email received by the recipient's email account/application, the user must access the recipient's email account/application by entering a normal security level authentication (e.g., password) (S20). This normal level security authentication (e.g., password) will only allow the user of the recipient's email account/application to view the contents of an email identified as having a normal level of security (S20).

Next, the method may provide the user of the recipient's email account/application the option to step-up the level of authentication (S30). If the user does not want to step-up the level of authentication (NO at S30), then the user will only be allowed to view contents of emails identified as having a normal level of security (S40). However, if the user wants to step-up the level of authentication (YES at S30), then the user will be prompted to enter a high security level authentication (e.g., password) (S50).

If the user does not enter an authentication (e.g., the user realizes that the high level security authentication is unknown) (NO at S60), then the user will only be allowed to view contents of emails identified as having a normal level of security (S40). Similarly, if the user enters a authentication (e.g., password) (YES at S60), but the authentication (e.g., password) is incorrect (NO at S70), then, as mentioned above, the user will only be able to view contents of emails identified as having a normal level of security (S40).

On the other hand, if the authentication (e.g., password) input by the user matches the high security level authentication (e.g., password) (YES at S70) then the user will be able to view the contents of emails both identified as having a normal level of security and a high level of security (S80).

This method may also provide the user an opportunity to initiate the step-up process (YES at S90), even after the user (i) has opted to not step up the security (NO at S30), (ii) has opted to not enter a authentication (e.g., password) (NO at S60), or (iii) has entered an incorrect authentication (e.g., password) (NO at S70). Once the user initiates the step-up process (YES at S90) the user will be prompted to enter the high security level authentication (e.g., password) (S50) and continue through the step-up process, as described above (S60-S80). This high security level authentication (e.g., password) may also be replace by alternative methods of authentication, such as, but not limited to, a fingerprint scan or a retinal scan.

In addition, a properly authenticated user of the recipient's email account may have the option to (i) identify any email in the email account/application as being a normal security level email or a high security level email or (ii) set up specific rules to designate emails as being normal security level emails or high security level emails at the time or after receipt thereof (not illustrated).

Furthermore, a properly authenticated user may also have the option to "lock" their mail application by initializing a locking function so that high security level emails are no longer visible or accessible to the user. This locking function may be initialized by, for example, a sequence of keys of the users' keyboard or a menu function selected by the user.

Moreover, a properly authenticated user of the recipient's email account may have the option of hiding the existence of any emails having a high level of security, such that the user of the recipient's email account/application will not be able to view the subject or existence of any email that has a high level of security (not illustrated). This will eliminate the possibility of a non-authenticated user viewing confidential or highly sensitive information contained in the subject line of a high security level email. Only by stepping up the authentication level will the user be able to recognize the existence of the high security level emails.

Furthermore, if an existing email or an email sent by a sender does not have a designated security level associated therewith, the recipient's email account/application may, by default, designate a normal level of security, a high level of security, or even a low level of security that is lower than the normal level of security.

Also, as an alternative to the above-mentioned embodiment, the user of the recipient's email account/application may not automatically be given the option to step-up the authentication level (S30), wherein the authentication level may only be stepped up when requested by the user (S40).

An embodiment of this invention may provide a properly authenticated user the ability to designate a particular email folder as being a high security level email folder. As an example, a properly authenticated user may want to place all pay stub related emails in a particular folder that requires a high level of authentication.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

The invention claimed is:

1. A method of restricting access to emails of a recipient's email account by providing multiple levels of user authentication such that a user of the recipient's email account is only granted access to view emails for which the user has obtained proper authentication based on a designated security level, said method of restricting access comprising:

sending an email, from a sender to the recipient's email account, such that the security level of the email sent by the sender is designated by the sender;

receiving the email into the recipient's email account;

accessing the recipient's email account at a normal authentication level by entering a normal security level authentication to allow the user of the recipient's email account to only view emails that are designated as having a normal security level;

stepping up the authentication level of the user of the recipient's email account by entering, when prompted, a high security level authentication to allow the user of the recipient's email account to view emails designated as having a high security level and view the emails designated as having the normal security level, wherein, if the user of the recipient's email account is prompted to step-up the authentication level and the user decides not to enter any authentication, then the user will not be granted permission to view any email designated as a high security level email, wherein, if the user of the recipient's email account is prompted to step-up the authentication level and the user enters an incorrect authentication, then the user will not be granted permission to view any email designated as a high security level email, wherein a properly authenticated user has the ability to designate any email as being one of a high security level email and a normal security level email, and wherein a properly authenticated user has the ability to determine whether or not an existence of an email designated as a high security level email is to be hidden from the user of the recipient's email account.

* * * * *